United States Patent [19]

Soo Hoo

[11] 4,313,511
[45] Feb. 2, 1982

[54] LAND VEHICLE

[76] Inventor: Wayne J. Soo Hoo, 4861 N. Paulina, Chicago, Ill. 60640

[21] Appl. No.: 185,033

[22] Filed: Sep. 8, 1980

[51] Int. Cl.³ .............................................. B62D 9/02
[52] U.S. Cl. ................................ 180/21; 280/112 A; 280/293
[58] Field of Search .................. 180/21, 219, 41, 209; 280/772, 112 A, 293, 771, 6 H

[56] References Cited

U.S. PATENT DOCUMENTS

| | | | |
|---|---|---|---|
| 2,641,480 | 6/1953 | Bancroft | 280/772 |
| 3,236,323 | 2/1966 | Austin | 280/293 X |
| 3,656,572 | 4/1972 | Mercier | 280/112 A X |
| 3,700,059 | 10/1972 | Sutton | 180/21 X |
| 4,133,402 | 1/1979 | Hoo | 180/209 |
| 4,203,500 | 5/1980 | Kamiya | 280/293 |

*Primary Examiner*—Joseph F. Peters, Jr.
*Assistant Examiner*—Randall A. Schrecengost

*Attorney, Agent, or Firm*—Bernard L. Kleinke

[57] ABSTRACT

A land vehicle has front, rear and two side wheels arranged in a diamond-shaped configuration to provide a triple track mode of operation. A steering mechanism mounted on the vehicle frame controls one of the front and rear wheel assemblies. Each one of the other wheel assemblies includes an articulated suspension having a suspension arm pivotally connected to the frame and having its wheel journaled for rotation thereon. A device is controlled by the steering mechanism and rotates the arm about its pivotal axis to tilt its suspension into the direction of a turn of the vehicle to facilitate its maneuverability. Another device controls the movement of the suspension arm for the driving wheel to maintain it in engagement with the terrain. The steering mechanism includes devices for causing the side wheels to turn in unison with the main steering wheel to facilitate steering of the vehicle.

10 Claims, 6 Drawing Figures

LAND VEHICLE

TECHNICAL FIELD

The present invention relates in general to a land vehicle, and it more particularly relates to a land vehicle which is highly compact and maneuverable.

BACKGROUND ART

There have been many different types and kinds of small economical land vehicles. For example, reference may be made to U.S. Pat. No. 4,133,402 of applicant, and the prior art references cited therein. In the foregoing mentioned patent, outrigger side wheels are mounted on a conventional motorcycle to provide a relatively low-cost fuel-efficient vehicle. In this regard, motorcycles are fuel-efficient vehicles, but they are not very practical for every day use to meet transportation needs. Thus, the automobile is far more practical for every day transportation needs, due to its closed-body construction for protecting the passengers therein. Also, the automobile is far more safe and stable in its operation as compared to motorcycles. Thus, in order to be more fuel-efficient and to minimize the manufacturing cost, automobiles have been made more compact in size and weight.

However, while being somewhat more fuel-efficient as compared to heavier vehicles, smaller size automobiles have not been entirely satisfactory for some applications in that they have not been as safe and as fuel efficient as might be desired. The smaller, light-weight vehicles are less maneuverable, especially when moving into a turn. The bodies of such vehicles have been ordinarily boxlike in configuration, and hence they have not been very streamlined in their outer contour to aid in reducing wind resistance aerodynamically, thereby limiting greatly their fuel efficiency. Thus, it would be highly desirable to have a small light-weight land vehicle, which is relatively stable and highly maneuverable, especially in its turning operations, and which is aerodynamically designed for aiding fuel efficiency.

As shown in U.S. Pat. No. 3,236,323, a triple track land vehicle having four wheels arranged in a diamond-shaped configuration, has been proposed since it can be readily provided with a vehicle body having a relatively smooth aerodynamic outer contour, to improve fuel economy. Also, such a vehicle could be provided with a single drive wheel, thereby eliminating the need for a differential. A differential is expensive to manufacture and to assemble to the vehicle, and adds unwanted weight to the vehicle and power-robbing friction to the drive train.

While such a four-wheel vehicle may be less expensive to manufacture and fuel-efficient to operate, the single drive wheel should remain in frictional engagement with the ground for more efficient operation. The problem is especially acute where the terrain is very uneven and where the drive wheel may tend to bounce. Thus, such a triple track vehicle should have provisions for maintaining the drive wheel in engagement with the ground. Also, such a vehicle should be safe to operate and be highly maneuverable, especially in turns. Such a vehicle should be relatively inexpensive to manufacture and have a light weight fuel-efficient design.

DISCLOSURE OF INVENTION

Therefore, the principal object of the present invention is to provide a new and approved land vehicle, which is light in weight, and which is highly maneuverable and relatively fuel-efficient to operate.

Another object of the present invention is to provide such a new and improved land vehicle, which has a diamond-shaped wheel configuration, and which maintains the driving wheel in engagement with the terrain.

Briefly, the above and further objects of the present invention are realized by providing a land vehicle which has front, rear and two side wheels arranged in a diamond-shaped configuration to provide a triple track mode of operation. A steering mechanism mounted on the vehicle frame controls one of the front and rear wheel assemblies. Each one of the other wheel assemblies includes an articulated suspension having a suspension arm pivotally connected to the frame and having its wheel journaled for rotation thereon. A device is controlled by the steering mechanism and rotates the arm about its pivotal axis to tilt its suspension into the direction of a turn of the vehicle to facilitate its maneuverability.

Another device controls the movement of the suspension arm for the driving wheel to maintain it in engagement with the terrain. The steering mechanism includes devices for causing the side wheels to turn in unison with the main steering wheel to facilitate steering of the vehicle.

BRIEF DESCRIPTION OF DRAWINGS

The above-mentioned and other objects and features of this invention and the manner of attaining them will become apparent, and the invention itself will be best understood by reference to the following description of an embodiment of the invention taken in conjunction with the accompanying drawings, wherein.

BEST MODE FOR CARRYING OUT THE INVENTION

Figure 1:
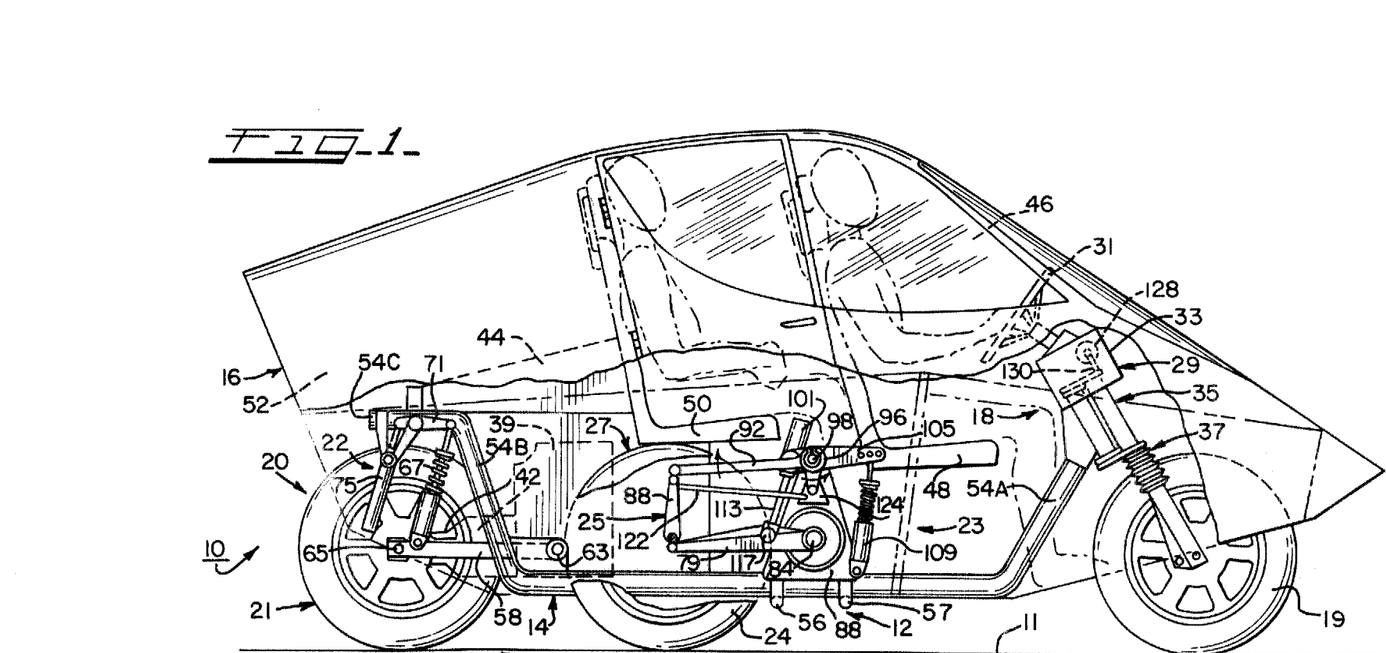
FIG. 1 is a right side elevational view of a land vehicle which is constructed in accordance with the present invention, and which has a portion thereof broken away for illustration purposes.
Figures 2, 4A, 4B:
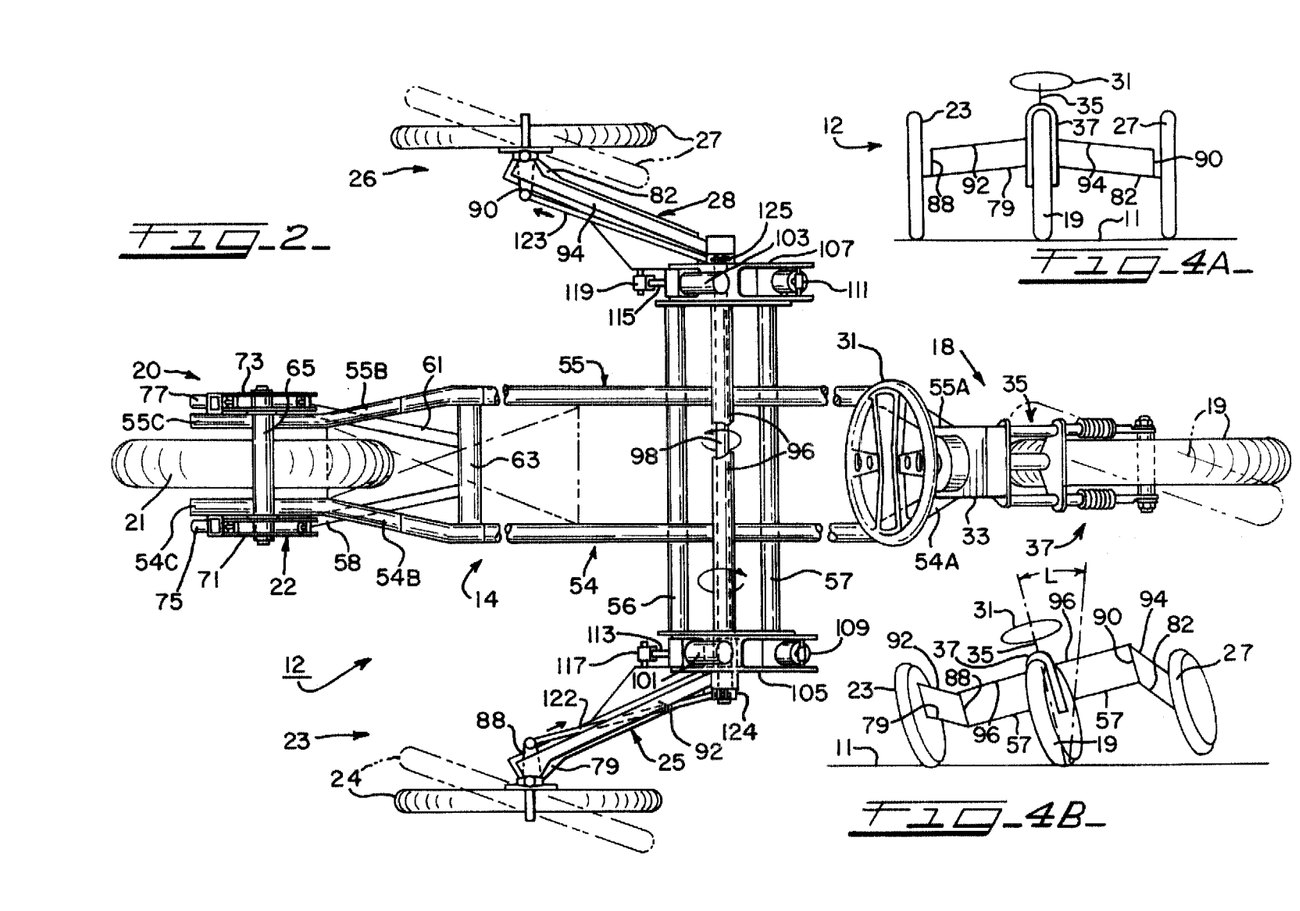
FIG. 2 is a somewhat enlarged plan view of the chassis of the vehicle of FIG. 1 with the vehicle body removed for illustration purposes.
FIGS. 4A and 4B are schematic drawings of the land vehicle of FIG. 1 illustrating the variable geometry assumed by the articulated suspension of the land vehicle of FIG. 1 before and after entering a sharp right turn.

Referring now to the drawings, and more particularly to FIGS. 1 and 2 thereof, there is shown a land vehicle 10, which is constructed in accordance with the present invention, and which is adapted to be propelled along the ground 11. The land vehicle 10 is in the form of a two-passenger automobile, but it is to be understood that those skilled in the art may recognize that the principles of the present invention may be utilized in connection with other types and kinds of vehicles, such as four-passenger automobiles, trucks, or other vehicles.

The vehicle 10 generally comprises a chassis 12 supported on a frame generally indicated in 14, and a vehicle body 16 supported by the chassis 12. In order to rollably support the chassis 12 above the ground 11, a front wheel assembly 18 is connected to the frame 14 and has a front wheel 19 journaled for rotation about a horizontal transverse axis. The wheel 19 is disposed in alignment with the longitudinal central axis of the frame 14. Spaced to the rear therefrom is a rear wheel assembly 20, which is mounted on the frame 14 and which has a rear wheel 21 journaled for rotation about a transverse horizontal axis to roll in line with and along a common track with the front wheel 19. A rear swinging link suspension 22 connects the rear wheel 19 to the frame 14.

In order to form a triple track support for the vehicle 10, a right side wheel assembly 23 is mounted on the frame 14 spaced slightly to the front of the rear wheel assembly and spaced rightwardly outwardly from the longitudinal central axis of the frame 14. The assembly 23 has a right side wheel 24 supported by means of a right side articulated swinging-link swept-back suspension 25. Similarly, a left side wheel assembly 26 is mounted on the chassis and extends leftwardly outwardly therefrom opposite the right side wheel assembly 23. The left side wheel assembly 26 has a left side wheel 27, and journaled for rotation thereon and being supported from the frame 14 by means of a left side articulated swinging-link swept-back suspension 28.

A steering mechanism 29 is used to control manually the attitude of the front wheel 19 for steering purposes. The steering mechanism 29 includes a manually-operable steering wheel 31 which is connected through a suitable gear box 34 to a steering column 35. The column 35 is connected through a strut-type front fork assembly 37, which is generally similar to the fork assembly for a motorcycle, to the front wheel 19.

As best seen in FIG. 1 of the drawings, an internal combustion 39 disposed to the rear of the rear seat 50 is carried by the frame 14. It is to be understood that any suitable engine may be employed, and if desired, an electrical motor may be substituted therefor. A transmission 42 drivingly connects the output of the engine 39 to the rear drive wheel 21. A fuel tank 44 is disposed above the engine 39 and supported by the frame 14.

A passenger compartment 46 is supported by the frame 14 and disposed between the front wheel 19 and the two side wheels. A front seat 48 is disposed within the passenger compartment and is adapted to support the driver of the vehicle. A rear seat 50 is disposed in a spaced apart manner from the front seat 48 and in line therewith to provide a compact tandem seating arrangement. A storage compartment 52 is provided to the rear of the rear seat 50 above the fuel tank 44.

Considering now the frame 14 in greater detail, with particular reference to FIG. 2 of the drawings, the frame 14 includes a pair of rigid longitudinal numbers 54 and 55 which extend in a parallel spaced-apart manner from the rear wheel assembly 20 to the front wheel assembly 18. A pair of parallel spaced-apart transverse frame members 56 and 57 are secured intermediate their ends to the longitudinal frame members 54 and 55.

As seen in FIGS. 1 and 2 of the drawings, the front ends of the longitudinal members 54 and 55 are bent upwardly and convergingly at the portions 54A and 55A to support the front wheel assembly 18. In a similar manner, the rear end portions of the longitudinal members 54 and 55 are bent upwardly at 54B and 55B and converge inwardly to terminate in a pair of parallel spaced-apart rear end portions 54C and 55C for supporting the rear wheel 21.

Considering now the rear wheel assembly 20 in greater detail with reference to FIGS. 1 and 2 of the drawings, the rear wheel assembly 20 includes a pair of right and left rear swinging suspension arms 58 and 61, respectively, which are pivotally attached at their forward ends to a frame cross member 63 fixed between the longitudinal frame members 54 and 55. The arms 58 and 61 swing about a horizontal transverse axis extending through the member 63. The rearward ends of the arms 58 and 61 diverge outwardly, and the rear wheel 21 is journaled for rotation about a rear axle 65 extending therebetween. A pair of right and left shock absorbers 67 and 69 have their lower ends connected to the respective arms of 58 and 61 near the axle 65. The upper ends of the shock absorbers are connected respectively to a pair of bell cranks 71 and 73 which are pivotally attached about a common horizontal transverse axis to the rear portions 54C and 55C of the frame 14 in alignment with one another. A pair of right and left hydraulic piston cylinders 75 and 77 are mounted on the respective frame portions 54C and 55C and have their respective piston rods connected to the rear ends of the respective bell cranks 71 and 73.

Considering now the right and left side articulated suspensions 25 and 28 in greater detail with particular reference to FIGS. 1 and 2 of the drawings, the two suspensions are similar to one another, and operate in a similar manner. The side suspensions include right and left lower swinging suspension arms 79 and 82, which extend longitudinally and are pivotally connected to the frame at their forward ends. The right lower suspension arm 79 is pivotally attached at 84 to a triangular mounting plate 86 fixed to the frame. The left lower suspension arm is attached in a similar manner not shown on the left side of the vehicle 10. A pair of right and left ball joint or steering knuckles 88 and 90 are connected to and extend upwardly from the rear ends of the respective lower suspension arms. The upper ends of the steering knuckles 88 and 90 are connected to the respective rear ends of a pair of left and right upper control arms 90 and 92 which extend longitudinally forwardly therefrom. As hereinafter described in greater detail, the members 79, 88 and 92 generally form a rectangular configuration which can be varied to enable the vehicle to lean into a turn.

The forward end of the upper control arm 92 is fixedly connected to an outer rigid tube or pipe 96 which extends horizontally and transversely between the left and right suspensions. Similarly, the forward end of the left upper suspension arm 96 is fixedly connected to an inner rigid tube or pipe 98 which extends telescopically within the outer pipe 96 transversely between the left and right suspensions. The two pipes rotate freely relative to one another. The cross coupling between the two left and right side suspensions facilitates the steering of the side wheels as hereinafter described in greater detail.

In order to cause the articulated suspensions to assume a leaning position as indicated in FIGS. 4A and 4B of the drawings, right and left piston cylinders 101 and 103 are pivotally attached to the respective rear ends of a pair of longitudinally extending right and left bell cranks 105 and 107. The bell cranks pivot freely about the outer pipe 96 and may be provided with suitable bearings (not shown) for that purpose.

Figure 5:
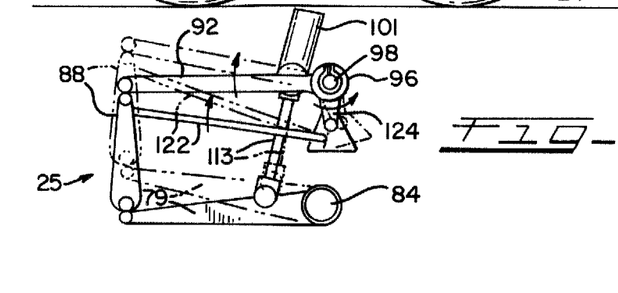
FIG. 5 is an elevational view of the right side suspension, illustrating in broken lines the adjusted position during a right turn.

A pair of right and left shock absorbers 109 and 111 connected pivotally at their respective upper ends to the forward ends of the bell cranks 105 and 107 extend downwardly therefrom and are connected pivotally at their opposite ends to the frame 14. The cylinders 101 and 103 operate in response to the steering mechanism to move the respective side suspensions from a rectangular configuration to a parallelogram configuration as indicated in FIGS. 4 and 5 of the drawings when the vehicle leans into a turn for improving greatly the stability of the vehicle during turns.

All of the shock absorbers disclosed herein are of the spring return type and serve to absorb impacts for the wheels. In this regard, shocks are absorbed by the side and rear shock absorbers through the swing suspension arms to the associated piston cylinders and bell cranks.

The piston cylinders 101 and 103 have respective piston rods 113 and 115 which are connected at their outer ends in a pivotal manner to the respective lower control arms 79 and 82. As hereinafter described in greater detail, the piston cylinder assemblies 101 and 103 cause the right and left side wheels to swing about their lower suspension arms during turning of the vehicle 10 in response to the steering mechanism 29. At the same time, the cylinders 101 and 103 control the steering for the side wheels as hereinafter described in greater detail. In this regard, a pair of right and left steering control arms 122 and 123 are connected between the respective upper portions of the right and left ball joints or steering knuckles 88 and 90, and pitman arms or ears 124 and 125, respectively. In this regard, the ear 124 is pivotally connected to the forward end of the steering control arm 122, and is connected fixedly to the right end of the inner pipe 98. At the left side of the vehicle 10, in a similar manner the upper end of the ear 125 is connected fixedly to the outer pipe 96. The inner pipe 98 and the right ear 124 fixed thereto moves the steering control arm 122 in response to movement of the upper left suspension arm 94 and the left cylinder 103. Similarly, the outer pipe 96 and the left ear 125 fixed thereto moves the left steering control arm 123 in response to movement of the upper right suspension arm 92 and the right cylinder 101.

Referring now to FIGS. 4A and 4B, there is shown schematically the vehicle chassis 12 in a normal upright position as shown in 4A. The chassis 12 of the vehicle 10 tilts or leans in a pronounced manner in a rightward direction when the vehicle 10 moves into a very sharp right hand turn as indicated in FIG. 4B of the drawings. It should be noted that the chassis 12 leans in an opposite complimentary manner (not shown) when the vehicle turns leftwardly.

As shown in FIG. 4B of the drawings, when the vehicle 10 moves into a very sharp right hand turn at a high rate of speed, the vehicle leans into the turn at a maximum lean angle L at approximately 17°. In this regard, due to the pivotal articulated connections of the side wheel suspensions 25 and 28, the chassis 12 shifts its geometry as indicated schematically in FIG. 4B of the drawings and as indicated in phantom lines in FIG. 5 of the drawings. In this regard, the articulated side wheel assemblies change their generally rectangular configuration to a parallelogram configuration.

When the vehicle moves into a right turn, the right side wheel 23 is pulled upwardly by means of the suspension 22, and the left wheel 27 is pushed downwardly. The reverse conditions occur during a left hand turn.

As best seen in FIG. 5 of the drawings, during a right hand turn, the piston rod 113 retracts into the cylinder 101 to swing the lower control arm 79 in a clockwise direction about the pivot point 84 to the position as indicated in phantom lines. As a result, the steering knuckle 88 moves upwardly and leans slightly rearwardly as indicated in phantom lines so that the upper control arm 92 also swings upwardly in a clockwise direction about the axis of the outer pipe 96. As a result, the members 79, 88 and 92 form three legs of a parallelogram to assume a leaning position or stance for the chassis 12 as best seen schematically in FIG. 4B of the drawings.

Since the lower control arm 79 swings upwardly in a clockwise direction, the right side wheel 24 swings slightly upwardly to provide a more equal distribution of the load on the side wheels. As hereinafter described in greater detail, the left or outer side wheel 27 moving into a right hand turn as best seen in FIG. 4B of the drawings tends to move upwardly, and for that reason the cylinder 103 causes the left lower suspension arm 82 to swing downwardly for equalizing the loading on the chassis 12. At the same time as mentioned previously, the articulated side suspensions assume a shifted position to cause the vehicle to lean into the turn for greater cornering stability and maneuverability.

When the vehicle 10 turns left, the vehicle chassis 12 leans into the direction of the turn. In such a turn, the inner or left side wheel 27 is pulled upwardly by the left lower suspension arm 82 in response to the left side cylinder 103. The outer or right side wheel 24 is pushed downwardly by the right lower supension arm 79 in response to the right side cylinder 101. Thus, the vehicle chassis 12 shifts its geometry to cause the chassis 12 to lean into the direction of the turn and, at the same time, the loading on the side wheels becomes more evenly distributed accordingly.

In addition to the variable geometry of the side articulated suspensions during turning of the vehicle 10, when the front steering mechanism 29 causes the front wheel 19 to move into a turn, the side cylinders 101 and 103 cause the side suspensions to shift into the leaned position, and at the same time, the side wheels are caused to be shifted in a parallel manner about a vertical axis into the direction of the turn. As indicated in phantom lines in FIGS. 2 and 3 of the drawings, during a right hand turn, the front wheel 19 moves to the right, and the two side wheels 24 and 27 turn to the right to help steer the vehicle 10 into the right hand turn. It should be noted that the right and left side wheels 24 and 27 are disposed in close proximity to the rear drive wheel 21 so that the side wheels need only move to a lesser degree than the front wheel 19.

The side cylinders 101 and 103 control the steering of the side wheels when they move the lower control arms 79 and 82. In this regard, during a right hand turn, the piston cylinder 101 retracts its piston rod 113, and the left piston cylinder 103 moves its piston rod 115 extensively downwardly. As a result, the right lower suspension arm 79 swings upwardly and the left lower suspension arm 82 swings downwardly. Thus, the steering knuckle 88 and the upper control arm 92 swing upwardly to move the outer pipe 96 in a counter clockwise direction as viewed from a position to the right of the vehicle 10 as indicated by the curved arrow in FIG. 2 of the drawings.

The inner pipe 98 rotates in an opposite direction relative to the direction of rotation of the outer pipe. In a right hand turn, the inner pipe rotates in a counter clockwise direction as viewed from a position to the right of the vehicle 10 as indicated by the curved line in FIG. 2 of the drawings. The left end of the outer pipe 96 is connected through the ear 125 to the steering control arm 123 to move it rearwardly in the direction of the arrow in FIG. 2 of the drawings for causing the left side wheel 27 to move into a toe-in position as indicated in phantom lines in FIG. 2 of the drawings. Similarly, the right hand end of the inner pipe 98 is connected through the ear 124 to the right steering control arm 122 to cause it to move forwardly in the direction of the arrow in FIG. 2 of the drawings. In this regard, as mentioned previously in connection with the description of FIG. 5 of the drawings, the arm 125 swings upwardly in a clockwise direction as indicated by the curved line in FIG. 5 of the drawings, thereby causing the arm 122 to move forwardly as pulled by the ear 124.

Therefore, it should now become apparent to those skilled in the art that the movement of the right cylinder 101 causes the left side wheel 27 to change its attitude for steering purposes, and, similarly, the left cylinder 103 steers the right side wheel 24. Thus, in response to the movement of the steering wheel 31, to steer the vehicle 10 into a right or left hand turn, the cylinders 101 and 103 cause the articulated suspensions to assume a leaning position, and at the same time, steer the side wheels 24 and 27 simultaneously.

Figure 3:
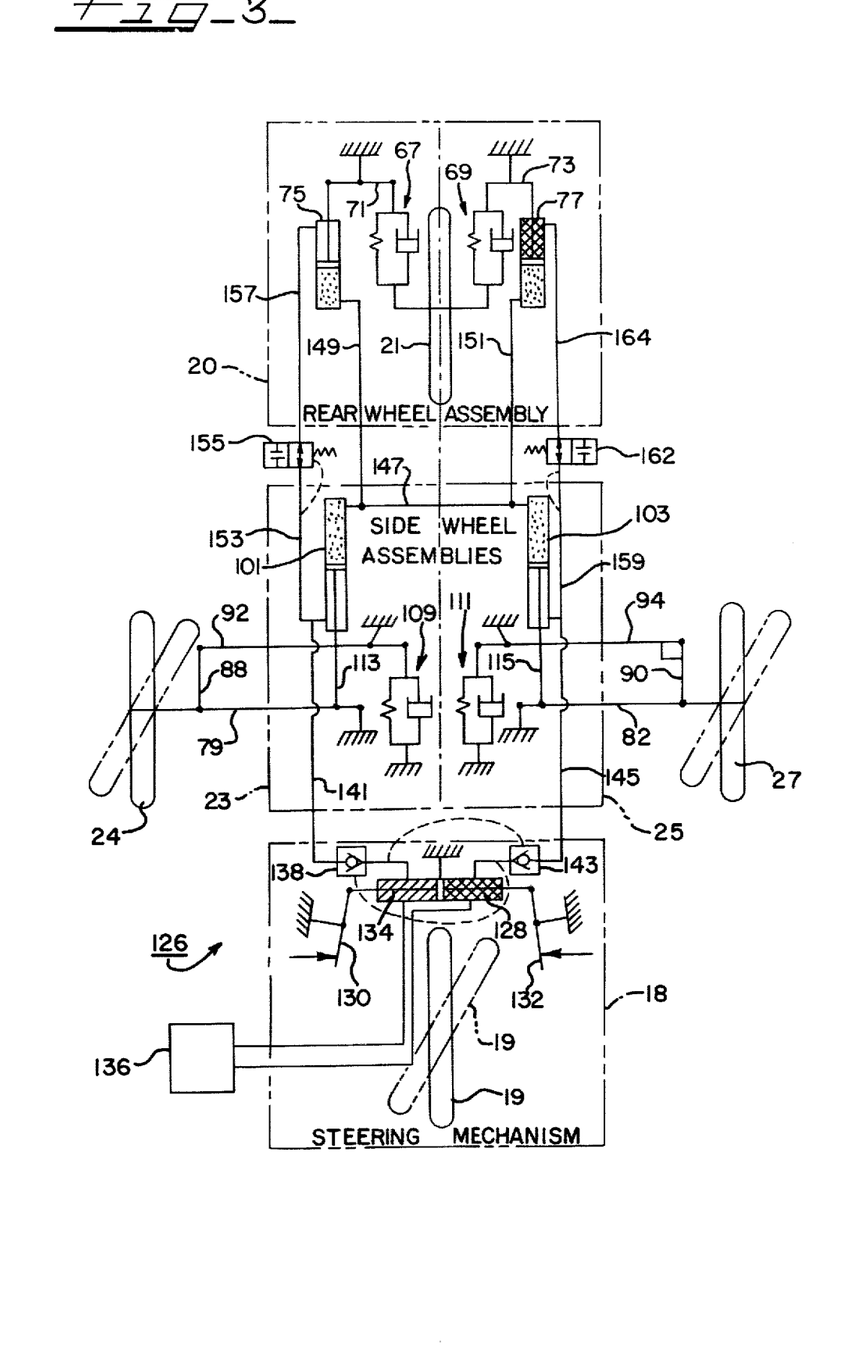
FIG. 3 is a schematic drawing of the hydraulic control system for the vehicle of FIG. 1.

Referring now to FIG. 3 of the drawings, there is shown a hydraulic control system 126 for the vehicle 10. The system 126 includes the side and rear piston cylinders. A double-acting piston rod cylinder 128 is shown schematically in FIG. 3 of the drawings and is a part of the steering mechanism 18 as indicated in broken lines in FIG. 1 of the drawings. A pair of right and left control links 130 and 132 are moved in response to the movement of the steering wheel 31, and they are shown schematically in FIG. 3 of the drawings (the link 130 is shown in broken lines in FIG. 1 of the drawings). The links are connected to opposite ends of the piston rod 124 for the cylinder 128. When the steering wheel 31 is turned to the right for a right turn, the piston rod 134 moves to the right as viewed in FIG. 3 of the drawings. When the steering wheel 31 is turned to the left, the piston rod 134 moves leftwardly as viewed in FIG. 3 of the drawings. It should be noted that in FIG. 3, the arrows pointing at the links 130 and 132 indicate forces produced on them by the steering wheel 31.

A hydraulic power source 136 is connected to the piston cyliner 128 to serve as a power assist, if needed, in a manner similar to an automotive power steering unit. Thus, the driver can more conveniently move the steering wheel 31, and thus the piston rod 134.

Opposite ends of the cylinder 128 are connected in fluid communication with the side wheel piston cylinders 101 and 103 for controlling them during turning operations to produce the shifting of the articulated suspensions and to steer the side wheels. In this regard, one (on right side of vehicle) end of the cylinder 128 is connected through a pilot actuated check valve 138 through a right hydraulic line 141 to the lower end of the piston cylinder 101. Similarly, the other side (left side of vehicle) of the cylinder 128 is connected through a pilot actuated check valve 143 to a hydraulic line 145 to the lower end of the piston cylinder 103. When the vehicle is turned to the right, the piston rod 134 moves toward the right side of the vehicle 10 to force hydraulic fluid through the valve 138 to the cylinder 101 to cause its piston rod 113 to retract and thus pull upwardly the right side wheel 24. Similarly, when the vehicle 10 turns left, the piston rod 134 moves to the left side of the vehicle for forcing hydraulic fluid through the valve 143 to the lower end of the piston cylinder 103 for the purpose of retracting the piston rod 115 to pull up on the left side wheel 27.

A hydraulic line 147 cross couples in fluid communication the upper ends of the side piston cylinders 101 and 103. The line 147 enables one side wheel to move up while the opposite side wheel moves oppositely downwardly as described previously. In this regard, for example, during a right hand turn, the piston rod 113 is retracted upwardly to pull the wheel 24 upwardly, and thus hydraulic fluid flows through the line 147 to the upper end of the cylinder 103 to cause the piston rod 115 to move extensively downwardly for forcing the wheel 27 downwardly.

Similarly, during a left hand turn, the cylinder 103 retracts to pull the left side wheel 27 upwardly and to cause fluid to flow through the line 147 to the upper end of the cylinder 101, thereby causing the piston rod 113 to move extensively downwardly for pushing down on the right side wheel 124.

The hydraulic system 126 provides the vehicle 10 with a "walking beam suspension" to improve load distribution and stability. When the side wheels 24 and 27 are bumped upwardly, the rear piston cylinders 75 and 77 force the rear wheel 21 downwardly. Also, in the reverse situation, when the rear wheel is bumped upwardly, the side wheels are forced downwardly.

For this purpose, a hydraulic line interconnects in fluid communication the upper end of the cylinder 101 and the lower end of the right rear cylinder 75. Similarly, a hydraulic line interconnects in fluid communication the upper end of the cylinder 103 and the lower end of the left cylinder 77. As a result, should the side wheels 24 and 27 encounter a bump, the piston rods 113 and 115 are forced upwardly, thereby causing hydraulic fluid to flow through the lines 149 and 151 respectively, to the respective lower ends of the rear cylinders 75 and 77. Thus, the cylinders 75 and 77 move their bell cranks 71 and 73 to cause the respective shock absorbers 67 and 69 to move the right and left rear suspension arms 58 and 61 downwardly to urge the rear wheel 21 into engagement with the ground 11. Should the rear wheel 21 encounter a bump independently of the side wheels and move upwardly abruptly, the side wheels 24 and 27 are pressed downwardly into engagement with the ground. In this regard the upward movement of the rear wheel 21 causes the rear cylinders 75 and 77 to deliver forcibly hydraulic fluid via the respective lines 149 and 151 to the upper ends of the side cylinders 101 and 103. As a result, the piston rods 113 and 115 move extensively outwardly to force the respective side wheels 24 and 27 downwardly.

In order to complete the hydraulic paths for the rear cylinders 75 and 77, a hydraulic line 153 interconnects in fluid communication the lower end of the right cylinder 101 through a pilot operated 2-way valve to a hydraulic line 157 connected in fluid communication with the upper end of the right rear cylinder 75. Similarly, a hydraulic line 159 is connected in fluid communication with the lower end of the left cylinder 103 through a pilot operated 2-way valve 162 to a hydraulic line 164, which, in turn, is connected in fluid communication with the upper end of the left rear cylinder 77.

It should be noted that when the rear wheel 21 encounters a bump, hydraulic fluid is prevented from flowing to the steering cylinder 128 and interfering with steering by the one-way valves 138 and 143.

When the vehicle 10 attempts to perform an extremely fast sharp turn at a high rate of speed, the load shifts from the inner wheel, such as the right wheel 24 in a right turn, to the outer wheel, such as the left wheel 27 during a right turn. Under extreme conditions, almost the entire load shifts away from the inner side wheel to the outer side wheel, thereby tending to cause an unstable condition. In such a condition, the rear wheel 21 tends to swing forwardly toward the front wheel 19 due to the swinging link suspension of the rear suspension 22. In order to balance the loading and to eliminate the jacking of the rear wheel toward the front wheel, hydraulic pressure builds as a result of the forward swinging movement of the rear wheel 21 acting on the cylinders 75 and 77 to cause the two-way valves 155 and 162 to open and thus cut off the hydraulic connections between the side cylinders 101 and 103 and the respective rear cylinders 75 and 77.

As a result, the chassis 12 is locked into a fixed geometry, since the rear wheel 21 is unable to swing via its arms 58 and 61. Thus, in such an extreme turning situation, the vehicle 10 assumes a fixed three point configuration. In this regard, the vehicle 10 is supported by the front, rear and outer side wheels. Once the turn is completed safely, the pressure is reduced on the rear cylinders 75 and 77 to close the right valve 155. Thus, the hydraulic control system 126 automatically disconnects the walking beam suspension and the vehicle is converted into a fixed three point triangular configuration of a stable design. Once the turn is completed safely, the system 126 automatically re-establishes the walking beam suspension for its further use.

In view of the foregoing description, it will now be apparent to those skilled in the art that through the use of the hydraulic system, the roll angle of the vehicle 10 is biased into the direction of the turn, countering load transfers, the rolling of the vehicle in the opposite direction of the turn, as is common with the fixed geometry conventional automobiles. This is also an advantage in control and crash avoidance. Central tandem seating in the structure provides a margin of safety.

The steering wheel turns 90 degrees lock to lock. The camber angle extends to approximately 34 degrees from lock to lock, and the side wheels steer (Wbo/Wb)×90 degrees from lock to lock (Wbo=wheel base of side wheels, Wb=wheel base of vehicle). In short, the lean angle L (FIG. 4B) is a function of the steering angle, as may be contrasted with a motorcycle where the lean angle is a function of balancing cornering forces. The lean angle L is primarily responsible for countering cornering forces.

In the vehicle 10, a substantial amount of cornering load is cancelled by the lean angle of the vehicle. Any cornering forces greater than what is cancelled by the lean angle is transferred to the outboard or outer side wheel.

The vehicle chassis is suspended by four wheels, but the front and rear wheels function as a fulcrum about which the vehicle leans from side to side.

The majority of the vehicle weight is carried by the front and rear wheels. As a result, controlling the lean angle requires a relatively small amount of power. The advantage of the lean angle or positive cambering of the vehicle 10 in a turn is to reduce load transfer to the outside side wheel. This gives a more positive feel of control when the vehicle 10 leans into a turn and maintains a high percentage of its straight line load distribution. Because of physical limitation of lean angle (approximately 17 degrees), the vehicle 10 at high cornering rates develops some load transfer to the outside side wheel while maintaining a positive bank attitude. The bank attitude is the angle the wheels make with the road surface either positive or negative, if the former angle is toward the turning direction.

The capability of variable geometry for the suspension in the roll axis of the vehicle tends to reduce load transfer, but dynamic balance as in motorcycling is only partial. Instead, using a combination of lean angle and outside side wheel pick up to counter load transfer, establishes equilibrium when turning. The effect of leaning into a turn with four wheels, with a positive camber, is an advantage from a control and safety standpoint.

The vehicle occupants lean into a turn as on a motorcycle. The recovery from the lean attitude is for the most part due to centripetal force of cornering to right the vehicle.

Furthermore, as is well known in the art, bicycles and motorcycles are understood to be highly controllable 'unstable' vehicles. For many obvious reasons, including stability and protection, they do not meet everyday transportation needs. The conventional automobile is highly stable, but it must contend with sizeable load transfers disturbing optimum load and suspension geometry conditions when cornering, thereby reacting detrimentally to cornering control.

The vehicle 10 is a hybrid vehicle, and takes on the best characteristics of both two-wheel vehicles and conventional automobiles. The vehicle 10 exhibits both the high control response maintaining optimal loading in cornering, associated with the single track two-wheel vehicle, and the high stability of the prior known automobile.

The length of the vehicle 10 is substantially shorter than conventional automobiles. The body 16 is aerodynamically styled, because it has low frontal area. Area is greatest near the mid-space of the wheel base and tapers to the rear. When observed from the planview, the body 16 more readily approaches the aerodynamic ideal of a teardrop for improved fuel economy. The concentrated mass due to the cruciform structure of the chassis contributes to a favorable polar moment of inertia for stability during turns. The cruciform structure has fewer components than a conventional automobile frame.

Bending stress in the chassis 12 is reduced since the vehicle 10 has the limited ability to lean and hence reduce cornering stresses more in tension and compression. There is also the elimination, or at least a substantial reduction, in torsional stress to the chassis 12 because of the layout geometry of the vehicle 10. The weight is reduced to eliminate torsional and bending stiffening members, or reducing structural cross-sectional areas that have this component reflected in the stress analysis of the vehicle layout.

In the vehicle 10, both the front and rear wheel suspensions are independent. The side wheel suspensions are each basically trailing link type suspensions, except that the arms are extended in the track plane. The side cylinders are the variable elements which enable the whole vehicle to lean into a turn. The side cylinders allow infinite leaning positions through approximately 17 degrees from vertical left or right. In the hydraulic system 126, some elements are multifunctional elements, or elements serving more than one purpose or function, such as the side shock absorbers. Such a utilization of parts facilitates economy, light in weight, and simplicity of design.

The leaning ability of the vehicle 10 tends to camber the wheels in the direction of the turn to counteract tire distortion.

The diamond shape of the planform of a triple track four wheel vehicle 10 with one wheel drive with independent suspension, is practical in design when contending with bumps, irregular surfaces and cornering. The coupling of the side and rear wheel systems provides a walking beam suspension action, which disengages automatically during extremely sharp turns, thereby providing a dynamic switching action from a four wheel geometry to a three wheel geometry during turns. The side wheels, when used with relatively short wheel bases like that of the motorcycle, develop high roll angles or assymetric bump. Bridging occurs on concave symmetric bumps which reduce or in severe cases remove traction from the rear drive wheel.

When the vehicle 10 encounters an assymetric bump, jacking or bridging the wheel in the axis perpendicular to it causes loss of contact of the rear drive wheel or unstable rolling of the entire vehicle. The core of the problem results from small dimensions and three point geometry both in front view roll axis and side view pitch axis. On encountering an irregular surface at least one point tends to lose contact and loading completely. This load is then transferred to the rear remaining points which if adjacent in that view are dimensionally close, result in the prior mentioned high roll angles. If load points are opposite, bridging occurs. To summarize, the chief problems are disconcerting roll angles, rear wheel bridging and contention with high frame stress due to rapid load transfer. These effects are pronounced at low speeds and probably prohibitive at high speeds.

To overcome, or at least greatly minimize, those problems, and at the same time conserve what is advantageous in the vehicle 10, namely, economy and compactness, it is important to reduce rigidity and the inability to cope with road surfaces. The side and rear wheel assemblies are hydraulically linked. Spring isolation and dampening are provided for the rear and side assemblies as previously described.

The hydraulic linking coordinates the geometry of the side and rear wheels. This change creates a constant preload that, for the most part, is a function of selected load distribution cylinder size. By tying together the push end of the cylinders, the articulated suspension geometry varies between wheels and the rear wheel to distribute the load. In effect, the coupled rear wheel and side wheel assemblies complement each other and perform as a unit. Mathematically, the indeterminacy in modeling the system before the introduction of hydraulics is eliminated. The load distribution for such a configured system is completely determinant and computed as easily as for a conventional automotive layout. The hydraulic link couples the reaction in the side wheels and rear wheel, leaving the common pressure between, to be computed to resolve both reactions.

A hydraulic link hinges the planform across the side wheel axis. This gives a high degree of flexibility. It will become apparent that the hydraulic link creates two triangles in diamond planform which have common sides and are "hinged" along the axis of the side wheels. This creates two coupled stable triangles that contact all points on an irregular surface and maintain an ideal of even load distribution. Since the majority of the mass is concentrated in single plane and centrally supported by its main wheels in the layout, the lean angle is controlled, and the centripetal loads are dynamically countered in turn by, in effect, varying the geometry. The main body is in unstable equilibrium if given a degree of freedom. The leaning exploits the unstable equilibrium of the centrally supported mass, about the fulcrum of its main front and rear wheels, thereby requiring a minimum input energy to obtain the desired geometric variable control. Also, even though the rear and side wheels are linked, they retain their independent suspension characteristics.

The side wheel suspensions are of a trailing link type. The rear drive wheel is a swing axle. The hydraulic coupling of the two provides the characteristic of the walking beam suspension. The suspension system would best be described as a compound suspension, having the qualities of all three systems that make it up.

I claim:

1. In a land vehicle having a body rollably supported above the ground and mounted on a chassis having a frame provided with a plurality of wheels, at least one of which being powered to propel the vehicle along the ground, the arrangement comprising:
   a front wheel assembly being mounted on the frame on the longitudinal axis thereof and having a front wheel adapted to roll along the ground;
   a rear wheel assembly mounted on the frame on the longitudinal axis thereof spaced from the front wheel assembly and having a rear wheel adapted to roll along the ground in substantially the same track as the front wheel;
   a pair of side wheel assemblies being mounted on the frame opposite one another between said front and rear wheel assemblies spaced equally at opposite sides of the longitudinal axis of the frame, and having right and left side wheels adapted to roll along a pair of right and left side tracks;
   a steering mechanism mounted on the frame for controlling the attitude of one of said front and rear wheel assemblies for steering purposes, each one of the remaining wheel assemblies including suspension means, said suspension means including a first outwardly extending suspension arm pivotally connected to said frame and having its wheel mounted rotatably thereon, control means for pushing downwardly on the side wheel assembly suspension arms in response to upwardly directed forces acting on one of said front and rear wheels and alternatively for pushing downwardly on the remaining one of the suspension arms in response to upwardly directed forces acting on said side wheel assemblies.

2. In a land vehicle, the arrangement according to claim 1, further including cut-out means for disabling said control means to cause said remaining one of said assemblies to become independent of said side wheel assemblies during an extreme turning operation of the vehicle.

3. In a land vehicle, the arrangement according to claim 2, wherein each one of said suspensions is articulated and shiftable into a leaning attitude, said control means causing said suspensions to assume said leaning attitude when said vehicle turns.

4. In a land vehicle, the arrangement according to claim 3, wherein each one of said suspensions includes a steering knuckle pivotally connected at one of its ends to said arm, further including a second arm extending in a parallel spaced-apart manner relative to the first-mentioned arm, said second arm being pivotally attached at one of its ends to said steering knuckle, a piston cylinder for moving swingably the first-mentioned arm.

5. In a land vehicle, the arrangement according to claim 4, further including a steering control arm connected pivotally at one of its ends to said steering knuckle, transverse means connecting the steering arms of said side wheel assemblies steering said side wheels in unison in response to the side cylinders moving said arms.

6. In a land vehicle, the arrangement according to claim 5, wherein said transverse means includes a pair of inner and outer telescoping tubes, a right ear connecting one of said steering arms and one end of one of said telescoping tubes, a left ear connecting the other one of said steering arms and the other end of the other one of said telescoping tubes.

7. In a land vehicle, the arrangement according to claim 6, wherein said steering mechanism includes a steering piston cylinder connected in fluid communication with the side and rear wheel cylinders, one-way valve means for preventing back flow into said steering cylinder.

8. In a land vehicle, the arrangement according to claim 4, wherein each one of said suspensions includes a pivotally mounted bell crank having the cylinder attached to one end portion thereof, a shock absorber connected to the other end portion of said bell crank.

9. In a land vehicle, the arrangement according to claim 4, further including means responsive to said steering mechanism for moving the steering knuckles to steer the side wheels in unison.

10. In a land vehicle, the arrangement according to claim 2, wherein said control means includes hydraulic cylinders, said cut-out means including valve means operative at a predetermined pressure.

* * * * *